R. J. DEARBORN.
BEARING.
APPLICATION FILED NOV. 13, 1917.
1,412,342.
Patented Apr. 11, 1922.
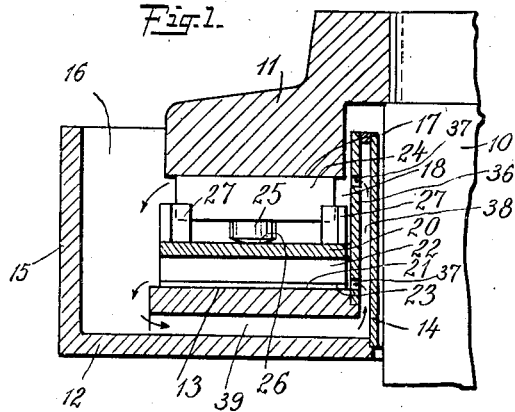
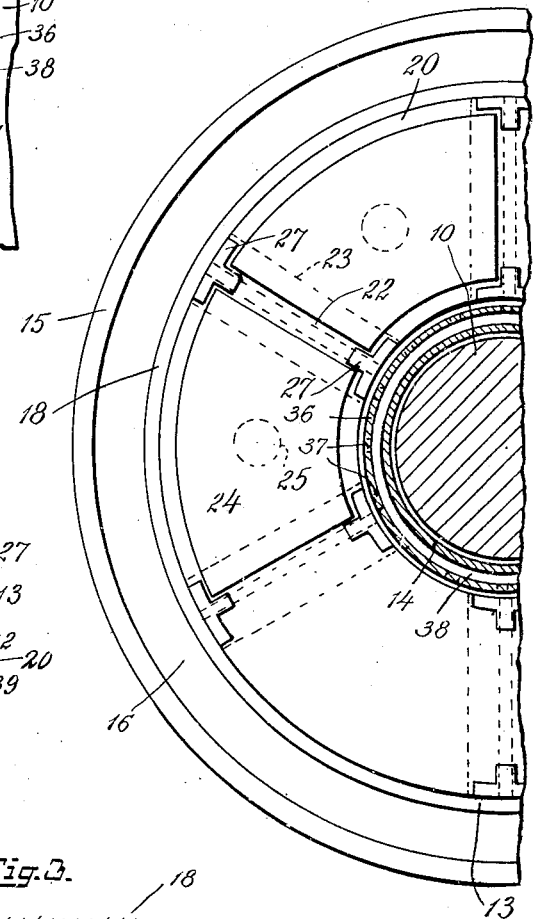
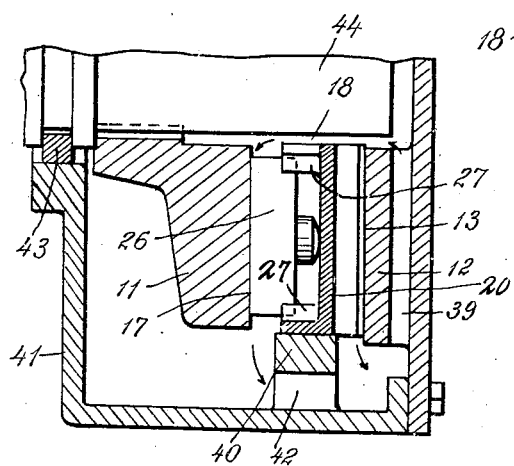
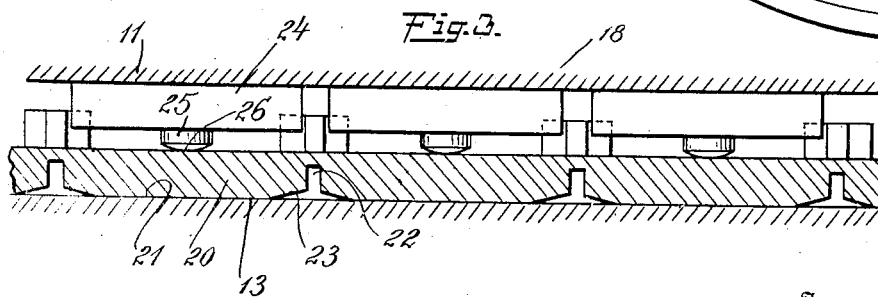
Inventor
Richard J. Dearborn
By his Attorneys
Marshall & Dearborn

UNITED STATES PATENT OFFICE.

RICHARD J. DEARBORN, OF PLANDOME, NEW YORK, ASSIGNOR TO ALBERT KINGSBURY, OF PITTSBURGH, PENNSYLVANIA.

BEARING.

1,412,342.  Specification of Letters Patent.  Patented Apr. 11, 1922.

Application filed November 13, 1917. Serial No. 201,763.

*To all whom it may concern:*

Be it known that I, RICHARD J. DEARBORN, a citizen of the United States of America, and a resident of Plandome, Nassau County, and State of New York, have invented certain new and useful Improvements in Bearings, of which the following is a specification, reference being had to the accompanying drawings, forming a part thereof.

My invention relates to bearings, especially thrust bearings of the general type disclosed in Kingsbury Patents Nos. 947,242, 1,117,499, etc., and it has particular reference to bearings of this type adapted for use with members rotating at relatively high speed.

One object of my invention is to provide a simple bearing structure having a floating element, comprising tiltable bearing shoes and a combined thrust collar and shoe cage, which is adapted to be interposed between annular or other suitable bearing surfaces.

Another object of my invention is to provide a thrust bearing of the above character which is adapted to start with a relatively low friction and automatically maintain a lubricating film between the bearing surfaces at high speeds.

In order that my invention may be thoroughly understood I will now proceed to describe the same in the following specification by reference to two embodiments thereof, and then point out the novel features thereof in appended claims. The invention, however, is capable of receiving a variety of mechanical expressions only two of which are shown on the accompanying drawings, and it is to be understood that the drawings are for purposes of illustration only and are not to be construed as a definition of the limits of the invention, reference being had to the appended claims for that purpose.

Referring to the drawings:

Figure 1 is a sectional elevation of a portion of a thrust bearing arranged and constructed in accordance with my invention.

Figure 2 is a partial plan view of the same bearing.

Figure 3 is a partially sectional elevation of a bearing member constructed in conformity with the present invention developed into a single plane.

Figure 4 is a view corresponding to Figure 1 of a horizontal-shaft bearing constituting an embodiment of my invention.

Referring first to Figures 1, 2 and 3 of the drawings, 10 designates a shaft to which the thrust block 11 is affixed. On the form shown, the shaft extends through a suitable opening in a base 12 which is provided with a thrust bearing surface 13. Said base also carries a sleeve 14 which loosely surrounds the shaft 10 and an outer annular wall or flange 15 which cooperates with the sleeve 14 in forming an annular oil chamber 16. The thrust block 11 has an annular bearing surface 17 which is opposed to the bearing surface 13.

Within the oil chamber 16 and spaced at a short distance from the sleeve 14 is an annular plate 36 which is perforated at 37 opposite the bearing surfaces and which is shown as joined to the sleeve 14 at the top, the parts being so arranged that an annular oil passage 38 is formed. The base 12 has radial apertures constituting oil passages 39 which connect the outer part of the oil chamber 16 with the annular oil passage 38.

Between these surfaces is interposed a bearing structure 18 with which my invention is particularly concerned. In the form shown, this structure comprises an annular ring or thrust collar 20 having a thrust bearing surface 21 in which are a plurality of radial slots or grooves 22 dividing the surface of the ring into a plurality of bearing portions or segments. Adjacent to these grooves the bearing surface 21 is beveled as shown at 23, and said bearing surface 21 cooperates with the thrust surface 13 of the base. With the ring or collar 20 is associated a plurality of tiltably-mounted bearing shoes 24 which also form a part of the bearing structure 18, the ring or collar 20 preferably constituting a cage for said shoes.

These shoes have the form of ring sectors and in the embodiment illustrated each of them has a downwardly extending projection 25 provided with a spherically curved or crowned bottom surface 26 which rests on the back surface of the bearing ring 20, but the projections might be provided on the ring 20 and have curved surfaces engaging the bottom of the shoes without departing from the spirit of my invention. A plurality of upwardly extending lugs or angle projections 27 are secured to or form a part of the ring member 20, and fit loosely between the shoes 24 at their corners so that the shoes are prevented from rotating on their own pivots and from turning about the shaft center as an axis independently of the ring 20. They are nevertheless free to tilt both radially and circumferentially with respect to the axis of the bearing and to assume suitable positions to produce automatic lubrication between the bearing surfaces when the bearing is in operation as well as to maintain uniformity of bearing engagement over the entire width of the bearing members even when one or both of these members become unequally heated at their inner and outer zones during operation and assume the form of a frusto-conical surface of low altitude.

The beveled surfaces 23 serve to wedge the oil which is in the reservoir 16 between the bearing surfaces 13 and 21, and the bearing surface 17 and the cooperating bearing surfaces of the shoes are immersed in oil as clearly indicated in Figure 1.

When the parts are at rest and the bearing is started, the oil may be forced between the bearing surfaces 13 and 21, owing to the beveled surfaces 23, more quickly than between the surface 17 and the cooperating shoe surfaces, and for this reason the rotatable part of the bearings will start with less friction. The automatic lubrication will, however, be quickly established between the bearing surfaces of the shoes and the cooperating surface 17 of the thrust block, so that the bearing member 18 will rotate as a whole about the center of the shaft at a speed of approximately one-half the speed of the shaft itself. This arrangement is particularly useful with members rotating at relatively high speed.

In order that the bearing surfaces may be automatically lubricated it is necessary to supply the spaces between the shoes with oil. This may be accomplished, in any suitable way, but if the chamber 16 is filled sufficiently to flood the upper bearing surface 17 this result will be obtained in the structure illustrated. When the bearing is in operation the rotation of the bearing structure 18 tends to throw the oil radially outward, but more oil is supplied through the passages 39, 38 and 37 with the result that a circulation of oil is established. This prevents local heating of the oil and in fact tends to reduce the temperature of the body of oil.

Figure 4 shows a horizontal-shaft bearing which also embodies my invention, like parts being designated by the same reference characters as in the previous figures.

In the form here shown, the horizontal shaft 44 has attached thereto a thrust block 11 provided with a bearing surface 17 and the housing 41 is provided with a base or thrust member 12 secured thereto or formed thereon and provided with an opposed bearing surface 13. The housing 41 is shown as closely surrounding the shaft adjacent the thrust block 11 and is preferably provided at this place with a packing ring 43 to close the oil chamber formed within the housing. The ring or collar 20, which constitutes the shoe cage as well as one bearing element of the interposed movable bearing member, is rotatively mounted in a bearing ring or member 40 having one or more axial passages 42 therein to provide for the oil circulation as indicated by the arrows in Figure 4.

The shoes may be tiltably mounted on the bearing ring in variety of ways and other details of the structure may be varied without departing from the spirit of my invention. Various other mechanical expressions of this invention will also readily suggest themselves to those skilled in the art while certain features thereof are capable of use without other features thereof. Reference is therefore to be had to the claims hereto appended for a definition of the limits of this invention.

What I claim is:

1. A thrust bearing having opposed bearing surfaces and an interposed floating bearing structure comprising a thrust collar having a bearing surface adapted to cooperate with one of the opposed surfaces and a plurality of shoes mounted on the collar and adapted to engage the other of said opposed surfaces.

2. A thrust bearing having opposed bearing surfaces and an interposed floating bearing structure comprising a thrust collar having a bearing surface adapted to cooperate with one of the opposed surfaces and a plurality of shoes tiltably mounted on the collar and adapted to engage the other of said opposed surfaces.

3. A thrust bearing having opposed bearing surfaces and an interposed floating bearing structure comprising a thrust collar adapted to cooperate with one of the opposed surfaces and a plurality of shoes mounted on the collar and adapted to engage the other surface, said collar having substantially radial grooves and having its surface beveled adjacent to the grooves.

4. A thrust bearing having opposed bearing surfaces and an interposed floating bearing structure comprising a thrust collar adapted to cooperate with one of the opposed surfaces and a plurality of shoes mounted on the collar and adapted to engage the other surface, said collar having substantially radial grooves and being formed to establish an oil film between its own and the cooperating bearing surface.

5. A thrust bearing having opposed bearing surfaces and an interposed floating bearing structure comprising a thrust collar adapted to cooperate with one of the opposed surfaces and a plurality of shoes tiltably supported on the collar and adapted to engage the other surface, said collar having substantially radial grooves and having its surface beveled adjacent to the grooves.

6. A thrust bearing having opposed bearing surfaces and an interposed floating bearing structure comprising a thrust collar adapted to cooperate with one of the opposed surfaces and a plurality of shoes tiltably supported on the collar and adapted to engage the other surface, said collar having substantially radial grooves and being formed to establish an oil film between its own and the cooperating bearing surface.

7. A thrust bearing having opposed bearing surfaces and an interposed floating bearing structure comprising a thrust collar having a bearing surface adapted to cooperate with one of the opposed surfaces and a plurality of shoes mounted thereon to tilt radially with respect to the axis of the bearing, said shoes being adapted to engage the other of said opposed surfaces.

8. A thrust bearing having opposed bearing surfaces and in interposed floating bearing structure comprising a thrust collar having a bearing surface adapted to cooperate with one of the opposed surfaces and a plurality of shoes mounted thereon to tilt both radially and circumferentially with respect to the axis of the bearing, said shoes being adapted to engage the other of said opposed surfaces.

9. A thrust bearing having opposed bearing surfaces and an interposed floating bearing structure having a bearing surface constructed to diminish starting friction and engaging one of said opposed bearing surfaces, said bearing structure comprising tiltably mounted bearing shoes cooperating with the other of said opposed surfaces and being normally rotatable during the operation of the bearing.

10. A thrust bearing having opposed bearing surfaces and an interposed floating bearing structure having a bearing surface engaging one of said opposed surfaces and provided with beveled oil-admitting portions, said bearing structure comprising tiltably mounted bearing shoes cooperating with the other of said opposed surfaces.

11. A thrust bearing having opposed bearing surfaces and an interposed floating bearing structure comprising a ring divided by transverse slots into a plurality of bearing portions cooperating with one of said opposed surfaces, and bearing shoes tiltably mounted on said ring and cooperating with the other of said opposed surfaces.

12. A thrust bearing having opposed bearing surfaces and an interposed floating bearing structure comprising a ring divided by transverse slots into a plurality of bearing portions cooperating with one of said opposed surfaces and a bearing shoe tiltably mounted on said ring opposite each of said bearing portions and cooperating with the other of said opposed surfaces.

13. A thrust bearing having opposed bearing surfaces and an interposed floating bearing structure comprising a collar cooperating with one of said opposed surfaces and a plurality of bearing shoes tiltably mounted on said collar and cooperating with the other of said opposed surfaces, said collar being constructed to constitute a cage for said shoes.

14. A thrust bearing having opposed bearing surfaces and an interposed floating bearing structure comprising a collar cooperating with one of said opposed surfaces, one of said cooperating surfaces being constructed to facilitate the admission of oil therebetween, and bearing shoes tiltably mounted on said collar and cooperating with the other of said opposed surfaces.

15. A thrust bearing having opposed bearing surfaces and an interposed floating bearing structure comprising a collar cooperating with one of said opposed surfaces, one of said cooperating surfaces being constructed to facilitate the admission of oil therebetween, and bearing shoes mounted on said collar to tilt both radially and circumferentially with respect to the axis of the bearing and cooperating with the other of said opposed surfaces.

16. A thrust bearing having opposed bearing surfaces and an interposed floating bearing structure comprising a collar cooperating with one of said opposed surfaces, one of said cooperating surfaces being constructed to facilitate the admission of oil therebetween, and bearing shoes mounted on said collar to tilt independently of each other both radially and circumferentially with respect to the axis of the bearing and cooperating with the other of said opposed surfaces.

17. A thrust bearing having opposed bearing surfaces and an interposed floating bearing structure comprising a collar cooperating with one of said opposed bearing surfaces, one of said cooperating surfaces being constructed to facilitate the admission of oil therebetween, and bearing shoes mounted on said collar to tilt radially and cooperating with the other of said opposed surfaces.

18. A thrust bearing having opposed bearing surfaces and an interposed floating bearing structure comprising a collar cooperating with one of said opposed bearing surfaces, one of said cooperating surfaces being constructed to facilitate the admission of oil therebetween, and bearing shoes provided with spherically-ended projections engaging said collar and cooperating with the other of said opposed surfaces.

19. A thrust bearing having opposed bearing surfaces and an interposed floating bearing structure comprising a collar cooperating with one of said opposed bearing surfaces, one of said cooperating surfaces being constructed to facilitate the admission of oil therebetween, and bearing shoes on said collar and cooperating with the other of said opposed surfaces, said shoes being constructed and arranged to facilitate the formation of oil films between the same and said last-mentioned bearing surface.

20. A thrust bearing having opposed bearing surfaces and an interposed floating bearing structure comprising a thrust collar adapted to cooperate with one of the opposed surfaces and a plurality of shoes mounted on the collar and adapted to engage the other of said opposed surfaces, said collar having oil-admitting grooves in its bearing surface.

21. A thrust bearing having opposed bearing surfaces and an interposed floating bearing structure comprising a thrust collar adapted to cooperate with one of the opposed surfaces and a plurality of shoes tiltably mounted on the collar and adapted to engage the other of said opposed surfaces, said collar having oil-admitting grooves in its bearing surface.

22. A bearing having opposed bearing surfaces and an interposed rotatable bearing structure comprising a rotatable collar having a bearing surface adapted to engage one of said opposed surfaces and a plurality of bearing shoes mounted on said collar and adapted to engage the other of said opposed surfaces.

23. A bearing having opposed bearing surfaces and an interposed rotatable bearing structure comprising a rotatable collar having a bearing surface adapted to engage one of said opposed surfaces and a plurality of bearing shoes tiltably mounted on said collar and adapted to engage the other of said opposed surfaces.

24. A bearing having opposed bearing surfaces and an interposed rotatable bearing structure comprising a rotatable collar having a bearing surface adapted to engage one of said opposed surfaces and a plurality of bearing shoes mounted to tilt universally on said collar and adapted to engage the other of said opposed surfaces.

25. A bearing having opposed bearing surfaces and an interposed rotatable bearing structure comprising a rotatable collar engaging one of said surfaces, one of said engaging surfaces being constructed to facilitate the admission of oil therebetween, and a plurality of bearing shoes mounted on said collar and adapted to engage the other of said opposed surfaces.

26. A bearing having opposed bearing surfaces and an interposed rotatable bearing structure comprising a rotatable collar having a bearing surface divided by oil grooves into a plurality of bearing portions adapted to cooperate with one of said opposed surfaces, and a plurality of bearing shoes tiltably mounted on said collar and adapted to engage the other of said opposed surfaces.

27. A bearing having opposed bearing surfaces and an interposed rotatable bearing structure comprising a unitarily connected series of bearing segments adapted to cooperate with one of said opposed surfaces and a plurality of bearing shoes tiltably mounted on said segments and adapted to cooperate with the other of said opposed surfaces.

In witness whereof, I have hereunto set my hand this 12th day of November, 1917.

RICHARD J. DEARBORN.